United States Patent [19]

Yassa

[11] Patent Number: 4,888,719
[45] Date of Patent: Dec. 19, 1989

[54] SAMPLED-DATA SINE WAVE AND COSINE WAVE GENERATION BY ACCUMULATION

[75] Inventor: Fathy F. Yassa, Clifton Park, N.Y.

[73] Assignee: General Electric Company, Schenectady, N.Y.

[21] Appl. No.: 222,480

[22] Filed: Jul. 21, 1988

[51] Int. Cl.$^4$ .............................................. G06F 1/02
[52] U.S. Cl. .................................................... 364/721
[58] Field of Search ................................. 364/718, 721

[56] References Cited

U.S. PATENT DOCUMENTS 4,285,044  8/1981  Thomas et al. ...................... 364/721
4,577,287  3/1986  Chrin .................................. 364/721

OTHER PUBLICATIONS

J. F. Hart, Computer Approximations, © 1968 John Wiley & Sons, Inc, New York, London, Sydney, pp. 10-26.

Primary Examiner—David L. Clark
Assistant Examiner—Long T. Nguyen
Attorney, Agent, or Firm—Allen L. Limberg; James C. Davis, Jr.; Marvin Snyder

[57] ABSTRACT

Sine and cosine waves are simultaneously accumulated in accordance with the following equations in apparatus embodying the invention.

$$M \sin \theta = [M \sin (\theta - \delta\theta)] \cos \delta\theta + [M \cos (\theta - \delta\theta)] \sin \delta\theta$$

$$M \cos \theta = [M \cos (\theta - \delta\theta)] \cos \delta\theta - ]M \sin (\theta - \delta\theta)] \sin \delta\theta$$

Here $\delta\theta$ is an incremental angle between successive steps of accumulation.

21 Claims, 3 Drawing Sheets

SAMPLED-DATA SINE WAVE AND COSINE WAVE GENERATION BY ACCUMULATION

This invention relates to the generation, in sampled-data terms, of sine waves and cosine waves of the same frequency and in quadrature phase relationship with each other.

BACKGROUND OF THE INVENTION

It is sought to avoid the need for using large sine/cosine look-up tables stored in read-only memory (ROM) in order to specify the sine and cosine waves with high precision. Interpolation by linear methods from a ROM with a restricted number of entries does not provide sine and cosine waves with the requisite degree of harmonic purity needed in many applications. Several prior art sine and cosine wave approximation methods have insufficient freedom from harmonic distortion for use in these applications requiring high-precision sine or cosine waves or both.

Digital oscillator methods known in the prior art have strong tendencies to provide slightly under-damped or slightly overdamped oscillations, which departure from unity damping is unacceptable in these applications. For example, oscillators for generating sine-waves can be constructed utilizing the equation $$y(n) = A\ y(n-1) + B\ y(n-2) + Cx(n-1)$$

where $x(n)=1$ for $n=0$ and $x(n)=0$ for all other n. These oscillators take advantage of the second derivative of sin $\omega t$ being $-\omega^2$ times as large as sin $\omega t$, the differential equations describing such analog signal behavior being used to generate difference equations in sampled-data terms, of the sort set forth in the preceding sentence. Another digital oscillator method that is known to the inventor, but is unacceptable in that oscillations tend to decay with time, is constructed as a filter for the unit impulse. The filter has a transfer function based on the z transform of the desired output function sin($\omega nT$), which transfer function equals $$z^{-1} \sin(\omega T)/[1 - 2\ z^{-1} \cos(\omega T) + z^{-2}].$$

SUMMARY OF THE INVENTION

An object of the invention is to provide a digital oscillator for generating sine or cosine waves or both with no more than five percent distortion and with pronounced tendency for unity damping factor on the oscillations, as the oscillations neither grow in amplitude nor decay over time.

An object of the invention is to generate at least one of sine wave and cosine wave terms in sampled-data form at regularly recurring sample times separated by periods more than sixteen times shorter than that of the waves, where storage of sine wave and cosine wave samples in read-only memory becomes less practical.

The area of special interest is the generation of sine and cosine waves where there are at least sixteen samples per cycle and where the number of bits of resolution per sample required to keep distortion satisfactorily low requires a read only memory to store the samples that is larger than the 4096-bit read only memories that can be manufactured at low cost both in money and in silicon-area terms.

To achieve these objects, especially in the area of special interest, sampled-data sine and cosine waves of the same frequency and amplitude are simultaneously accumulated based on the elementary trigonometric relations set forth in the following equations (1) and (2) below:

$$\sin(A+B) = \sin A \cos B + \cos A \sin B \quad (1)$$

$$\cos(A+B) = \cos A \cos B - \sin A \sin B \quad (2)$$

Defining A as a preceding value of angle $(\theta - \delta\theta)$ to be incremented by a small angle $B = \delta\theta$ to arrive at a current value of angle, equations (1) and (2) may be rewritten as equations (3) and (4) following.

$$\sin \theta = \sin(\theta - \delta\theta) \cos \delta\theta + \cos(\theta - \delta\theta) \sin \delta\theta \quad (3)$$

$$\cos \theta = \cos(\theta - \delta\theta) \cos \delta\theta - \sin(\theta - \delta\theta) \sin \delta\theta \quad (4)$$

Here $\delta\theta$ is considered the change in the angle $\theta$ between the regularly recurring sample times. Equations (3) and (4) define a representative one of the algorithms in which sin $\theta$ and cos $\theta$ may be simultaneously accumulated in accordance with the invention.

More generally, accumulation is governed by the following equations (5) and (6), derived from equations (3) and (4) by multiplying both sides of these equations by an arbitrary scaling factor M on a distributed basis, M being a real number.

$$M \sin \theta = [M \sin(\theta - \delta\theta)] \cos \delta\theta + [M \cos(\theta - \delta\theta)] \sin \delta\theta \quad (5)$$

$$M \cos \theta = [M \cos(\theta - \delta\theta)] \cos \delta\theta - [M \sin(\theta - \delta\theta)] \sin \delta\theta \quad (6)$$

DETAILED DESCRIPTION

Figure 1:
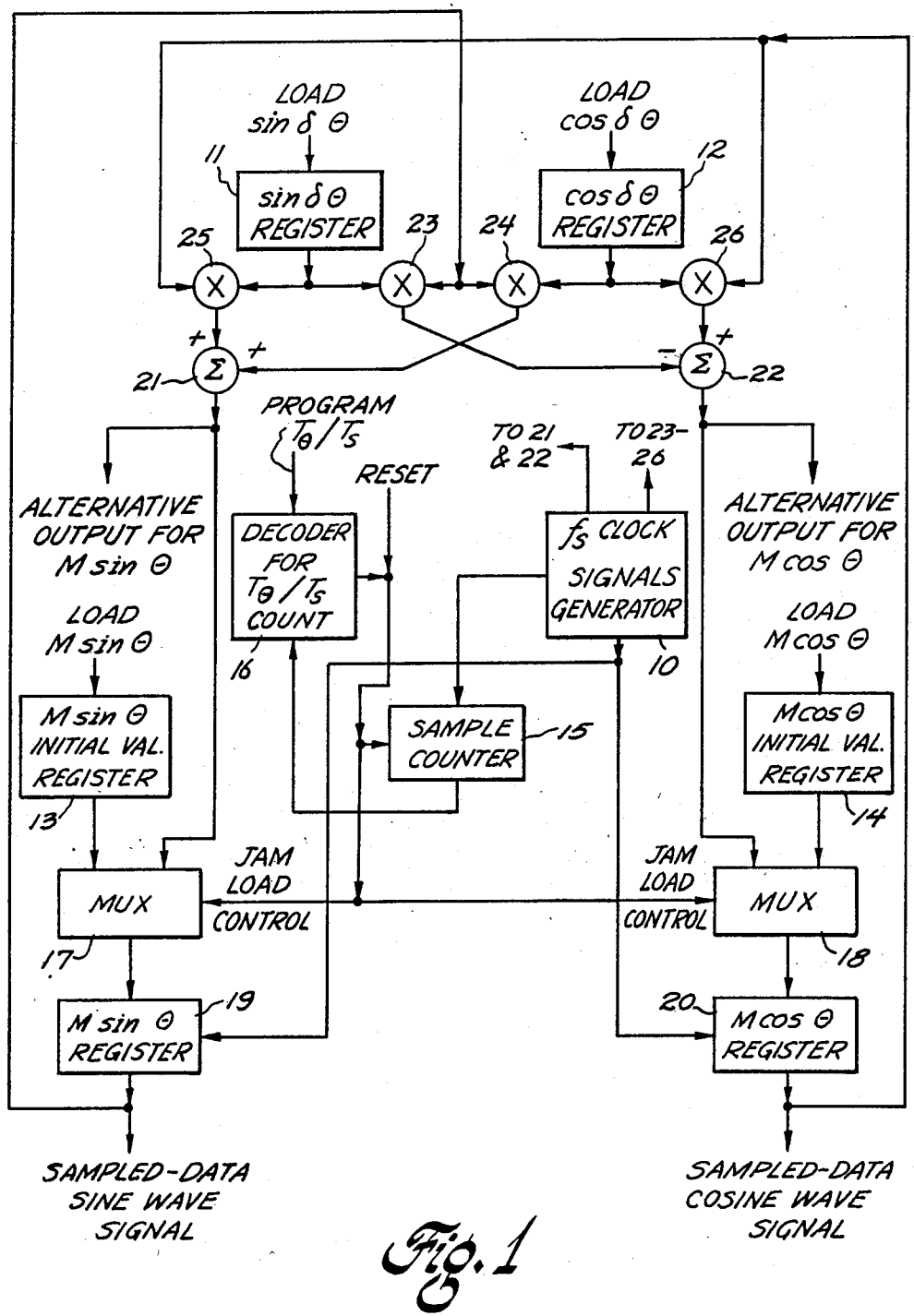
FIG. 1 is a schematic diagram of apparatus for simultaneously accumulating a sine wave M sin $\theta$ and a cosine wave M cos $\theta$, which apparatus embodies the invention.

As shown in FIG. 1, a generator 10 supplies clock signals at sample rate $f_s$ having a periodicity $T_s = 1/f_s$. The frequency of the sampled-data sine wave and cosine wave to be generated by the apparatus shown in the drawing is $f_\theta$ having a periodicity $T_\theta = 1/f_\theta$.

The incremental angle change $\delta\theta$ that occurs over each period $T_s$ is $2\ T_s/T_\theta$, which equals $2\ f_\theta/f_s$. So knowing $f_\theta$ (or $T_\theta$), $\delta\theta$ is determined. Knowing $\delta\theta$, values of sin$\delta\theta$ and cos$\delta\theta$ may be determined (e.g., by table look-up, the method of determining these values not being shown in the drawing) for loading into a sin $\delta\theta$ register 11 and into a cos $\delta\theta$ register 12, respectively. Respective initial values of M sin $\theta$ and of M cos $\theta$, M sin $\theta_0$ and M cos $\theta_0$, are loaded into initial-value registers 13 and 14, respectively. When M, $f_\theta$ in terms of $f_s$, and the initial values of the sine and cosine waves are invariant and so need not be programmable, registers 11-14 can be replaced by hard-wired binary numbers of appropriate value, of course.

A sample counter 15 receives $f_s$ clocking signals at its count input port, for sequentially counting the number of $T_s$ sample periods that transpire after a reset signal is applied to counter 15. Reset typically is to the all-zero condition. Counter 15 has sufficient count capacity to count to $f_s/f_{\theta-MIN}$, where $f_{\theta-MIN}$ is the minimum frequency of sin $\theta$ and cos $\theta$ that is to be expected, supposing $f_s$ is chosen to be a multiple of $f_\theta$. A decoder 16 responds to counter 15 reaching the count $(T_\theta/T_s)$ associated with reset to reset counter 15 and to generate jam load control signals for controlling selection by multiplexers 17 and 18 to accumulation registers 19 and 20. ("Jam loading" of an accumulation register such as 19 or 20 refers to a value being inserted into that register other than that generated by normal accumulation procedure.) Responsive to its jam load control signal, multiplexer 17 selects the initial value M sin $\theta_o$ stored in register 13 (or hard-wired to multiplexer 17 where this is alternatively done) for loading into the input port of an accumulation register 9 for M sin $\theta$ signal. Responsive to its jam load control signal multiplexer 18 selects the initial value M cos $\theta_o$ stored in register 14 (or hard-wired to multiplexer 18 where this is alternatively done) for loading into the input port of an accumulation register 20 for M cos $\theta$ signal.

For all other counts than reset count from counter 15, decoder 16 does not generate jam load control signals for application to multiplexers 17 and 18. In the absence of jam load control signal being applied thereto, multiplexer 17 selects for loading into the input port of accumulation register 19 the sum output signal of an adder 21. In the absence of jam load control signal being applied thereto, multiplexer 18 selects for loading into the input port of accumulation register 20 the difference output signal of a subtractor 22. Accumulation registers 19 and 20 receive $f_s$ clocking signals from source 10 thereof and respond to each clocking signal to update their contents responsive to the signals received at their respective input ports.

The accumulation registers 19 and 20 supply current values of M sin $\theta$ and M cos $\theta$ in sampled-data form. For a subsequent $T_s$ sample period—i.e., for the next accumulation cycle—these are the M sin $(\theta-\delta\theta)$ and M cos $(\theta-\delta\theta)$ values. The M sin $(\theta-\delta\theta)$ value for the next accumulation cycle is supplied as multiplicand signals for digital multipliers 23 and 24 to be multiplied by sin $\delta\theta$ and by cos $\delta\theta$ respectively supplied as multiplier signals from registers 11 and 12. Analogously, the M cos $(\theta-\delta\theta)$ value for this next accumulation is supplied as multiplicand signals for digital multipliers 25 and 26 to be multiplied by sin $\delta\theta$ and cos $\delta\theta$ respectively. Adder 21 sums the M sin $(\theta-\delta\theta)$ cos $\delta\theta$ product signal from digital multiplier 24 and the M cos $(\theta-\delta\theta)$ sin $\delta\theta$ product from digital multiplier 25 to supply the next value of M sin $\theta$ to the accumulation register 19 via multiplexer 17. Subtractor 22 subtracts the M sin $(\theta-\delta\theta)$ sin $\delta\theta$ product provided digital multiplier 23 from the M cos $(\theta-\delta\theta)$ cos $\delta\theta$ product provided by digital multiplier 26, thereby to supply the next value of M cos $\theta$ to the accumulation register 20 via multiplexer 18.

The generation of sampled-data M sin $\theta$ and M cos $\theta$ in registers 19 and 20 continues in the same way until decoder 16 decodes a prescribed $T_\theta/T_s$ count to generate a reset pulse for restarting the wave generation process at the beginning of a subsequent $T_\theta$ period. While the sine wave and cosine wave generation processes could go forward without restarting, periodic restart cleans accumulation errors from the registers 19 and 20. Periodically restarting only once per $T_\theta$ period introduces a correction that causes the M cos $\theta$ and M sin $\theta$ output signals to tend to be accompanied by direct terms and by harmonic terms.

Figure 2:
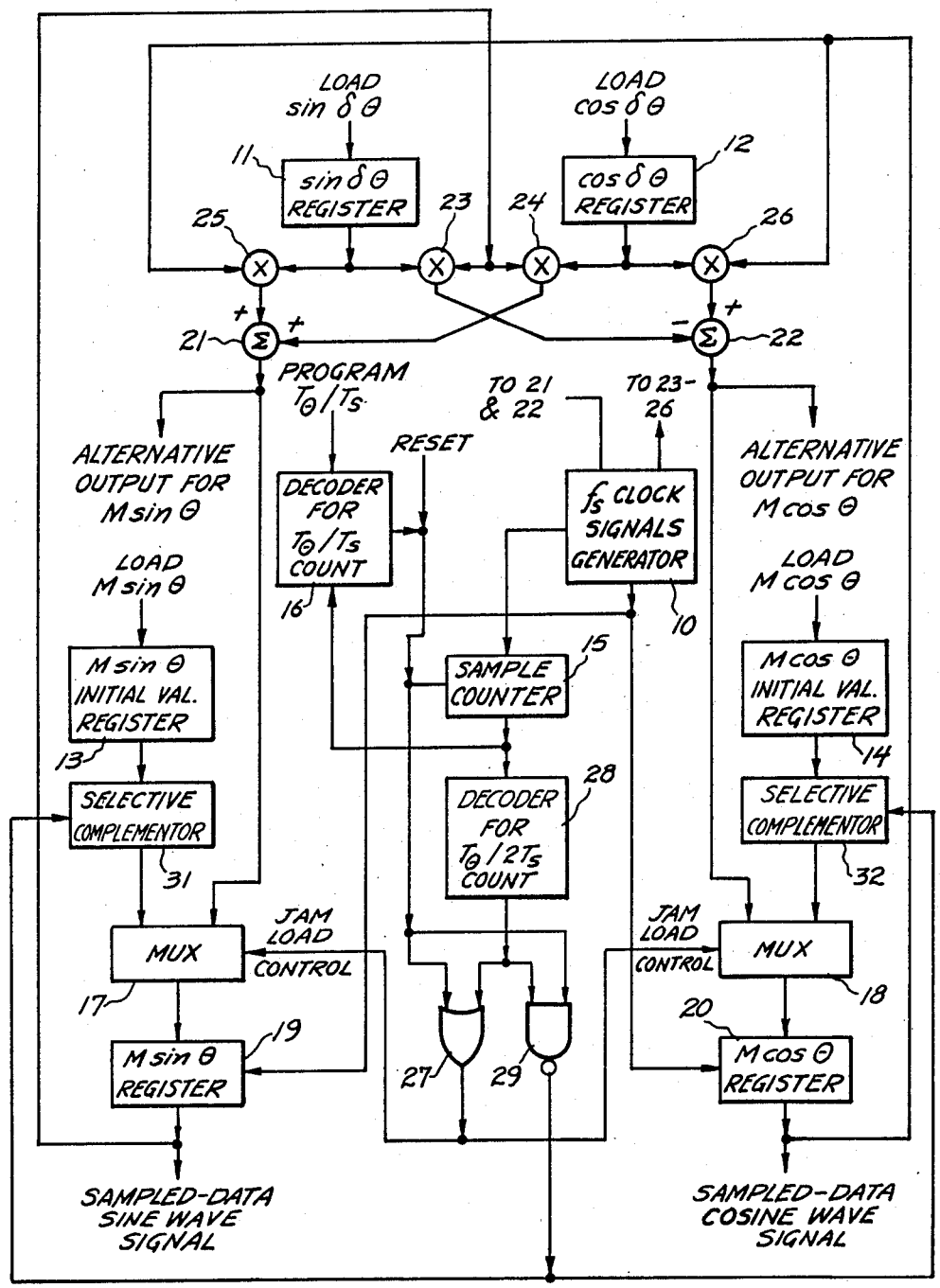
FIG. 2 is a modification of the FIG. 1 apparatus, which modified apparatus embodies the invention in a further one of its aspects.

FIG. 2 shows a modification of the FIG. 1 apparatus wherein periodic restarting is done twice per $T_\theta$ period. Restarting at $\pi$ radian intervals in $\theta$ suppresses the tendencies for restart to introduce into each of the M cos $\theta$ and M sin $\theta$ output signals a respective direct term and respective harmonic terms. Since accumulation errors tend to be somewhat smaller over shorter periods of time, other harmonic terms may be reduced in amplitude as well, by restarting at $\pi$ rather than $2\pi$ radian intervals in $\theta$. When this is done restart will occur not only every time sample counter 15 is reset, but also midway between the times counter 15 is reset.

In the FIG. 2 apparatus the jam load control signals for multiplexers 17 and 18 are generated at the output port of an OR gate 27. OR gate 27 generates a ONE at its output port, which ONE commands jam loading, responsive to a ONE generated by a decoder 28 when a $T_\theta/2T_s$ count is reached by counter 15, or responsive to a ONE generated by the decoder 16 when $T_\theta/T_s$ count is reached. Unless the values multiplexer 17 jams into M sin $\theta$ register 19 at $\theta=0$ radians and $\theta=\pi$ radians are both zero, these values should be opposite in polarity. And, unless the values multiplexer 18 jams into M cos $\theta$ register 20 at $\theta=0$ radians and at $\theta=\pi$ radians are both zero, these values also should be opposite in polarity. An arrangement to invert the polarities of M sin $\theta_o$ and of M cos $\theta_o$ as jammed into registers 19 and 20 is needed when $\theta$ is an odd multiple of $\pi$.

One way to do this is as follows, proceeding with distinguishing between the two types of jam load condition. A NAND gate 29 receives the output signals of the decoders 16 and 28 at respective ones of its input ports. When $\theta$ equals zero radians (or an even multiple of $\pi$ radians) decoders 16 and 28 both issue ONEs, and NAND gate 29 output signal is a ZERO. When $\theta$ equals $\pi$ radians (or an odd multiple thereof) decoder 16 issues a ONE, but decoder 28 issues a ZERO, so NAND gate 29 output signal is a ONE.

In the FIG. 2 apparatus a selective complementer 31 is interposed between the M sin $\theta$ initial value register 13 and multiplexer 17, and a selective complementer 32 is interposed between the M cos $\theta$ initial value register 14 and multiplexer 18. Each of the selective complementers 31 and 32 responds to a control signal supplied thereto from the output port of NAND gate 29. When NAND gate 29 supplies a ZERO as control signal, the output ports of selective complementers 31 and 32 supply the same numbers applied to their respective input ports without polarity reversal. When NAND gate 29 supplies a ONE as control signal, the output ports of the selective complementers 31 and 32 supply numbers of like amplitudes but of opposite polarities, respectively, to those applied to their input ports. A selective complementer for the two's complement numbering system conventionally used for signed arithmetic can be constructed from a bank of exclusive-OR gates for the control signal and each bit of the input signal to the selective complementer, followed by an adder adding the one's complement result to a number formed with ZEROs in all bit places except the least significant, which least significant bit place is occupied by the control signal from NAND gate 29.

Where $T_\theta/T_s$ is an integral power of two, in another embodiment of the invention, decoder 28 can be replaced by a decoder that decodes only those bits less significant than the most significant to generate jam load control signals directly, and OR gate 27 can be dispensed with.

If cleansing of errors from accumulation registers 19 and 20 more frequently than twice per cycle is desired, decoder 28 may be replaced by decoder and logic circuitry to generate the jam load signals associated with respective restarts more frequently. Arrangements are then made to load initial value registers before each restart with respective ones of respective cycles of initial values. These cycles of values can be stored in a sine/cosine look-up-table ROM addressed by a counter counting the number of times jam load signals are applied to multiplexers 17 and 18. In effect, the invention is then used as an interpolator for use with sine/cosine look-up-table ROM, which interpolator permits appreciably longer intervals between stored values than is possible with linear interpolation methods or with polynomial interpolation methods when harmonic distortion must be kept low.

It is most convenient to arrange only for jam loading M sin $\theta_o$ and M cos $\theta_o$ values for $\theta_o$ equalling 0°, 90°, 180° or 270° because then neither of the initial value registers will be required to carry extended binary fractions. On the other hand providing initial value registers with the capability of carrying extended binary fractions is useful where a number of the sine/cosine wave generators of the invention are to be operated concurrently, but with phase offsets between them. The plurality of sine/cosine wave generators can share the same elements 10, 15, 16, 27, 28, 29. Their different initial values determine the phasing of their output waves. For example in an arrangement using three sine/cosine wave generators having initial value registers loaded with M sin $\theta_o$ and M cos $\theta_o$, with M sin ($\theta_o$+120°) and M cos ($\theta_o$+120°), and with M sin ($\theta_o$+240°) and M cos ($\theta_o$+240°) respectively, two sets of three-phase sinusoidal output signals are generated. By using these signals and their complements, twelve-phase sinusoidal signals are available with fixed 30° phasing between them.

Figure 3:
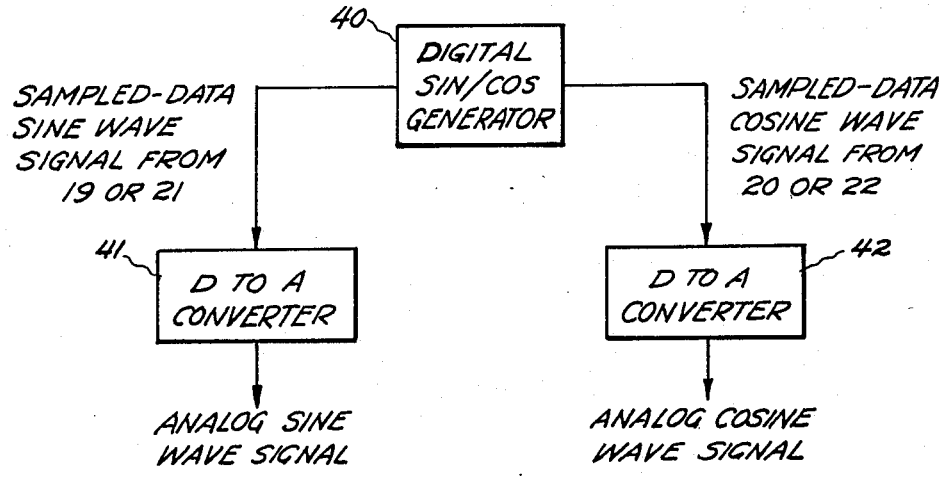
FIG. 3 is a schematic diagram of apparatus for generating precision analog sine and cosine waves, embodying a still further aspect of the invention.

FIG. 3 shows a digital sine and cosine wave generating apparatus 40 of the type shown in FIGURE 1 or of the type shown in FIG. 2 having a digital sine wave output signal therefrom converted to an analog sine wave output signal by a digital-to-analog converter 41. FIG. 3 also shows a digital cosine wave output signal from apparatus 40 being supplied to a digital-to-analog converter 42 for conversion to an analog cosine wave output signal. By making $f_s$ at least 256 times as large as the period of the sine and cosine waves and using eight-bit resolution, distortion can be kept below 3%. By making $f_s$ at least 1024 times as large as the period of the sine and cosine waves and using eight-bit resolution, distortion can be kept below 1%. Storage of the sine wave and cosine wave samples in read-only memory, rather than generating them by accumulation in accordance with the invention, would require unacceptably large memory.

Figure 4:
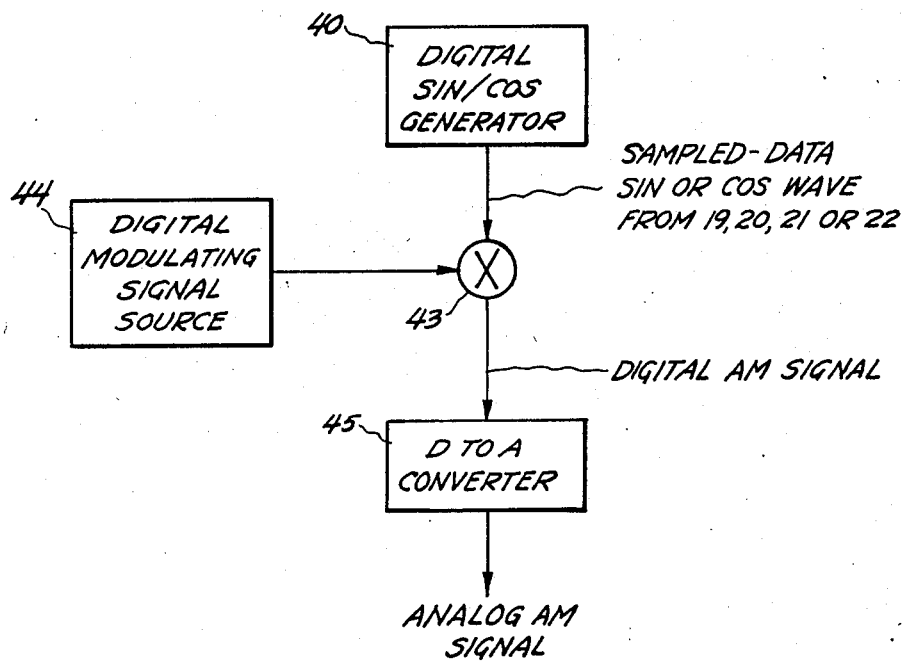
FIG. 4 is a schematic diagram of apparatus for generating amplitude-modulation signals in yet another aspect of the invention.

FIG. 4 shows the digital sine and cosine wave generating apparatus 40 being used as a source of carrier signal in an amplitude modulator. A digitized sine or cosine wave from generating apparatus 40 is supplied as multiplicand to a digital multiplier 43, there to be multiplied by a relatively-low-frequency digital modulating signal from a source 44 thereof. If the digital modulating signal is superposed upon a direct-component pedestal so its polarity is unchanging, and if digital multiplier 43 operates as a two-quadrant multiplier, the product signal from multiplier 43 will be a double-sideband amplitude-modulation signal not having its carrier suppressed. If source 44 supplies digital modulating signal that is not superposed on a direct-component pedestal, and if digital multiplier 43 operates as a four-quadrant multiplier, the product signal from multiplier 43 will be a suppressed-carrier double-sideband amplitude-modulation signal.

It may be desirable, where a large selection of amplitudes are desired from a sine and cosine wave generator, such as those of FIGS. 1 and 2, to use binary place shifters in the output signal connections to make order-of-magnitude changes and to vary M only for fine adjustment of amplitude values. This better maintains accuracy in the calculations because registers 13, 14, 19 and 20 are kept more "full" i.e, with fewer more significant bit places left unchanging at zero.

One may also arrange instead to operate with constant M and to alter the amplitudes of the output signal(s) with further digital multiplication(s). This has the advantage that sine wave and cosine wave amplitudes may be individually adjusted.

Suppose one desires to modify the apparatus shown in FIG. 1 or 2 to provide a stop/start oscillator. In such case, decoder 16 can be used to selectively withhold $f_s$ clock signals from sample counter is rather than to reset counter 15. Reset signal for the counter 15 is then furnished from another source and is used to command resumption of furnishing $f_s$ clock signals to counter 15.

Modifications of any of the previously described arrangements are possible wherein one of the output signals is inverted in polarity. In some applications only one of the output signals will be used. FIGS. 1 and 2 show address 21,22 and multipliers 23–26 being of clocked types, with clock signals for their output latches being forwarded to them from the $f_s$ clock signal generator 10. Where adders 21 and 22 are clocked type, M sin $\theta$ and M cos $\theta$ waves may be taken from their output ports for use in ensuing apparatus, rather than from the output ports of accumulation registers 19 and 20. One skilled in the art and acquainted with the foregoing disclosure will be enabled to design many variants of the invention, and this should be borne in mind when construing the scope of the claims which follow.

What is claimed is:

1. Apparatus for accumulating in sampled-data form sine and cosine waves of a given frequency, said apparatus comprising:

means for generating regularly recurring clock signals at a frequency of sampled data, which is substantially higher than the given frequency of said sine and cosine waves;

a sample counter for sequentially counting said clock signals, said counter responding to a reset signal to be reset to a specified count;

a first accumulation register for storing successive values of said sine wave, having an input port and an output port, and responding to each clock signal supplied thereto by said means for generating clock signals to store signal supplied to its input port, thereafter to appear at its output port until the next clock signal is supplied thereto;

a second accumulation register for storing successive values of said cosine wave, having an input port and an output port, and responding to each clock signal supplied thereto by said means for generating clock signals to store signal supplied to its input port, thereafter to appear at its output port until the next clock signal is supplied thereto;

means for detecting when said sample counter is at a count corresponding to a restart, at least one such count being reached by said sample counter before being reset to said specified count;

means for jam loading said first accumulation register with an initial stored value for said sine wave when a count corresponding to a restart is detected;

means for jam loading said second accumulation register with an initial stored value for said cosine wave when a count corresponding to a restart is detected;

means for multiplying the sample at the output port of said first accumulation register by a cosine of an angle to generate a first product signal, said angle being defined as $2\pi$ times the period of said clocking signals divided by the period of said sine and cosine waves;

means for multiplying the sample at the output port of said second accumulation register by the sine of said angle to generate a second product signal;

means for applying a sum of said first and second product signals to the input port of said first accumulation register, except when a count corresponding to a restart is detected;

means for multiplying the sample at the output port of said second accumulation register by the cosine of said angle to generate a third product signal;

means for multiplying the sample at the output port of said first accumulation register by the sine of said angle to generate a fourth product signal;

means for applying a difference of said third product signal less said fourth product signal to the input port of said second accumulation register, except when a count corresponding to a restart is detected; and means for taking as an output signal the signal appearing at one of said ports of said first and second accumulation registers.

2. Apparatus as set forth in claim 1 including:
means for applying said reset signal to said sample counter every time a count corresponding to a restart is detected, said count corresponding to restart being equal to the period of said sine and cosine waves divided by the period of said clocking signals.

3. Apparatus as set forth in claim 1 including:
means for applying said reset signal to said sample counter every second time a count corresponding to a restart is detected, said count corresponding to restart being equal to the period of said sine and cosine waves divided by twice the period of said clocking signals.

4. Apparatus as set forth in claim 1 in combination with:
a digital-to-analog converter for converting the sum of said first and second product signals to an analog sine wave.

5. Apparatus as set forth in claim 1 in combination with:
a digital-to-analog converter for converting the contents of said first accumulation register to an analog sine wave.

6. Apparatus as set forth in claim 1 in combination with:
a digital-to-analog converter for converting the difference of said third and fourth product signals to an analog cosine wave.

7. Apparatus as set forth in claim 1 in combination with:
a digital-to-analog converter for converting the contents of said second accumulation register to an analog cosine wave.

8. Apparatus as set forth in claim 1 included within an amplitude-modulated signal generator and in combination therewith:
a source of digital modulating signal; and
a digital multiplier receptive of the sum of said first and second product signals as multiplicand and of said digital modulating signal as multiplier for generating a fifth product signal.

9. Apparatus as set forth in claim 1 included within an amplitude-modulated signal generator and in combination therewith:
a source of digital modulating signal;
a digital multiplier receptive of the sum of said first and second product signals as multiplicand and of said digital modulating signal as multiplier for generating a fifth product signal; and
a digital-to-analog converter for converting said fifth product signal to an analog amplitude-modulated signal.

10. Apparatus as set forth in claim 1 included within an amplitude-modulated signal generator and in combination therewith:
a source of digital modulating signal; and
a digital multiplier receptive of the contents of said first accumulation register as multiplicand and of said digital modulating signal as multiplier for generating a fifth product signal.

11. Apparatus as set forth in claim 1 included within an amplitude-modulated signal generator and in combination therewith:
a source of digital modulating signal; and
a digital multiplier receptive of the contents of said first accumulation register as multiplicand and of said digital modulating signal as multiplier for generating a fifth product signal; and
a digital-to-analog converter for converting said fifth product signal to an analog amplitude-modulated signal.

12. Apparatus as set forth in claim 1 included within an amplitude-modulated signal generator and in combination therewith:
a source of digital modulating signal; and
a digital multiplier receptive of the difference of said third and fourth product signals as multiplicand and of said digital modulating signal as multiplier for generating a fifth product signal.

13. Apparatus as set forth in claim 1 included within an amplitude-modulated signal generator and in combination therewith:
a source of digital modulating signal;
a digital multiplier receptive of the difference of said third and fourth product signals as multiplicand and of said digital modulating signal as multiplier for generating a fifth product signal;

a digital-to-analog converter for converting said fifth product signal to an analog amplitude-modulated signal.

14. Apparatus as set forth in claim 1 included within an amplitude-modulated signal generator and in combination therewith with:
   a source of digital modulating signal; and
   a digital multiplier receptive of the contents of said second accumulation register as multiplicand and of said digital modulating signal as multiplier for generating a fifth product signal.

15. Apparatus as set forth in claim 1 included within an amplitude-modulated signal generator and in combination therewith with:
   a source of digital modulating signal;
   a digital multiplier receptive of the contents of said second accumulation register as multiplicand and of said digital modulating signal as multiplier for generating a fifth product signal; and
   a digital-to-analog converter for converting said fifth product signal to an analog amplitude-modulated signal.

16. Apparatus as set forth in claim 1 including:
   means for taking as an output signal one of the signals appearing at the output ports of said first and second accumulation registers.

17. Apparatus as set forth in claim 1 including:
   means for taking as an output signal one of the signals supplied to the input ports of said first and second accumulation registers for storing therein.

18. A method for accumulating within electronic apparatus sine and cosine waves of a given frequency in sampled-data form, said method comprising the steps of:
   generating regularly recurring clock signals at a rate at which said sine and cosine waves are to be sampled;
   sequentially counting said clock signals modulo the number of sampled-data in a cycle of said sine and cosine waves;
   detecting when a count occurs that corresponds with initial values of said sine and cosine waves; and
   accumulating current values of said sine and cosine waves during each successive count until the next count corresponding to initial values of those waves occurs, proceeding from the initial values of said sine and cosine waves that occur during a count corresponding to those initial values, which last named step includes the substeps of:
   specifying an incremental angle of $2\pi$ divided by the number of sampled data per cycle of each of said sine and cosine waves, said specification being in terms of a sine and a cosine for said incremental angle;
   multiplying the previous value of said sine wave by the cosine of said incremental angle to generate each successive sample of a first product signal;
   multiplying the previous value of said cosine wave by the sine of said incremental angle to generate each successive sample of a second product signal;
   adding the concurrent samples of said first and second product signals to generate each successive sample of said sine wave;
   multiplying the previous value of said cosine wave by the cosine of said incremental angle to generate each successive sample of a third product signal;
   multiplying the previous value of said sine wave by the sine of said incremental angle to generate each successive sample of a fourth product signal; and
   subtracting samples of said fourth product signal from concurrent samples of said third product signal to generate each successive sample of said cosine wave.

19. A method as set forth in claim 18 wherein initial values of said sine and cosine waves are re-established once every cycle of those waves.

20. A method as set forth in claim 18 wherein initial values of said sine and cosine waves are re-established once every half-cycle of these waves.

21. Apparatus for generating a wave of a given single frequency, said apparatus comprising:
   means for generating regularly recurring clock signals at a frequency of sampled data, which is substantially higher than said given single frequency;
   a sample counter for sequentially counting said clock signals, said counter responding to a reset signal to be reset to a specified count;
   a first accumulation register for storing successive values of a sine wave of said given single frequency, having an input port and an output port, and responding to each clock signal supplied thereto by said means for generating clock signals to store signal supplied to its input port, thereafter to appear at its output port until the next clock signal is supplied thereto;
   a second accumulation register for storing successive values of a cosine wave of said given single frequency, having an input port and an output port, and responding to each clock signal supplied thereto by said means for generating clock signals to store signal supplied to its input port, thereafter to appear at its output port until the next clock signal is supplied thereto;
   means for detecting when said sample counter is at a count corresponding to a restart, at least one such count being reached by said sample counter before being reset to said specified count;
   means for jam loading said first accumulation register with an initial stored value for said sine wave when a count corresponding to a restart is detected;
   means for jam loading said second accumulation register with an initial stored value for said cosine wave when a count corresponding to a restart is detected;
   means for multiplying the sample at the output port of said first accumulation register by a cosine of an angle to generate a first product signal, said angle being defined as $2\pi$ times the period of said clocking signals divided by the period of said sine and cosine waves;
   means for multiplying the sample at the output port of said second accumulation register by the sine of said angle to generate a second product signal;
   means for applying a sum of said first and second product signals to the input port of said first accumulation register, except when a count corresponding to a restart is detected;
   means for multiplying the sample at the output port of said second accumulation register by the cosine of said angle to generate a third product signal;
   means for multiplying the sample at the output port of said first accumulation register by the sine of said angle to generate a fourth product signal;
   means for applying a difference of said third product signal less said fourth product signal to the input port of said second accumulation register, except when a count corresponding to a restart is detected; and
   a digital-to-analog converter, having an input port receiving the signal appearing at one of said ports of said first and second accumulation registers, and having an output port from which said wave of a given single frequency is supplied.

* * * * *